Figure 1:
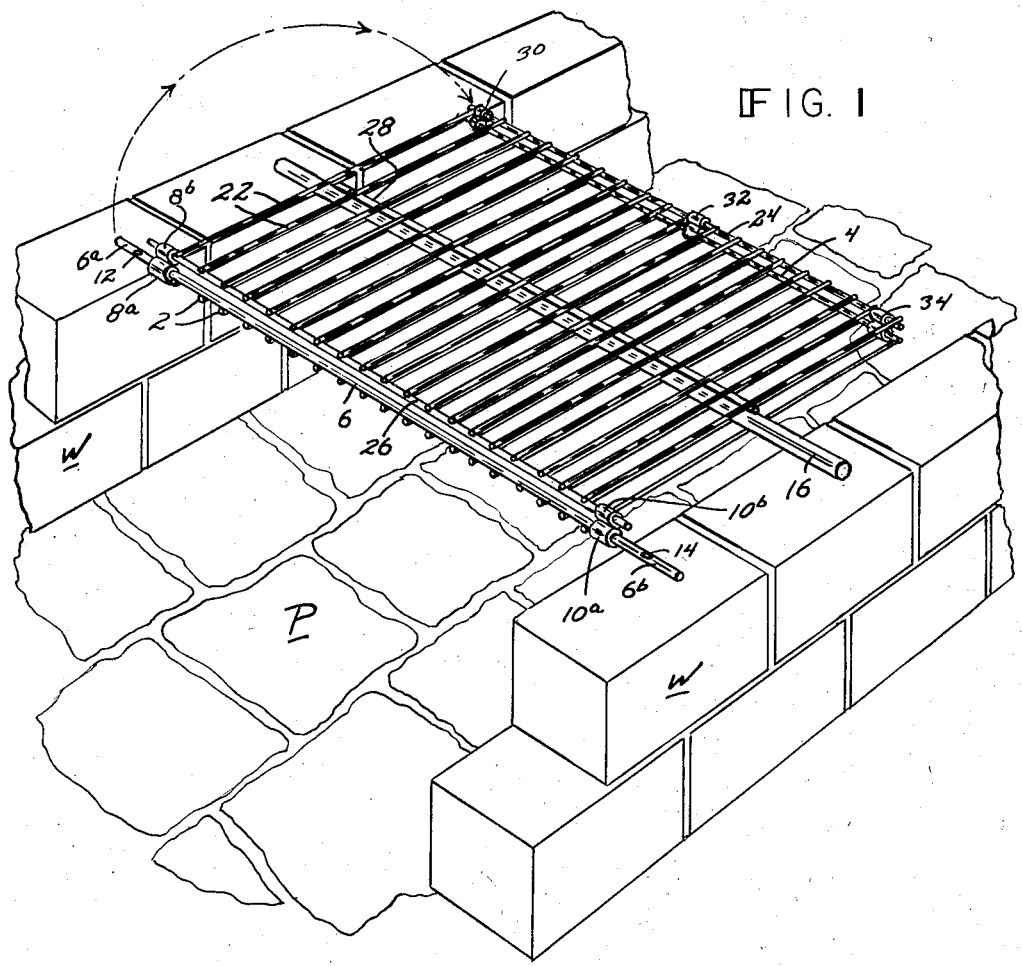

March 18, 1958  W. W. CHICK  2,826,981
BARBECUE RACK

Filed Jan. 3, 1956　　　　　　　　　　　　　　　　　　2 Sheets-Sheet 1

INVENTOR.
WALDO W. CHICK
BY Porter, Chittick & Russell
Attorneys

March 18, 1958 — W. W. CHICK — 2,826,981
BARBECUE RACK
Filed Jan. 3, 1956 — 2 Sheets-Sheet 2
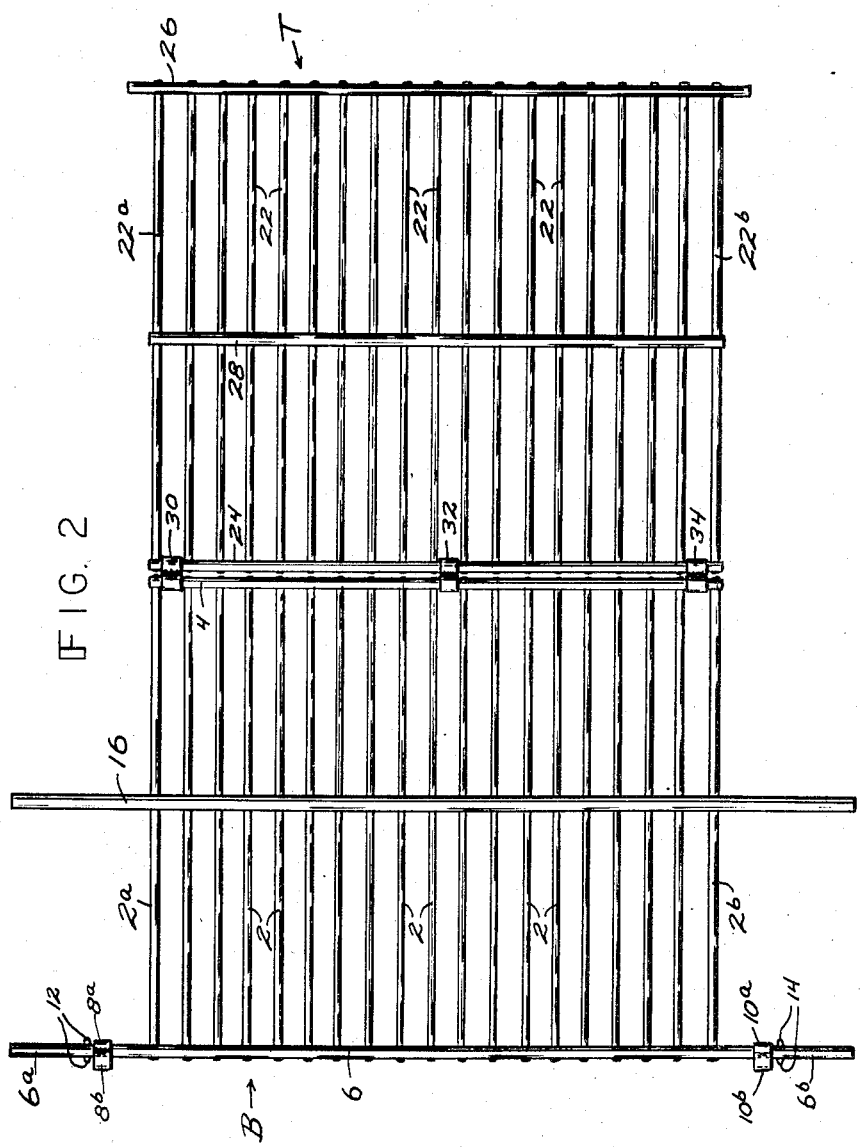
INVENTOR.
WALDO W. CHICK
BY Porter, Chittick & Russell
Attorneys

United States Patent Office 2,826,981
Patented Mar. 18, 1958

2,826,981

BARBECUE RACK

Waldo W. Chick, Wells, Maine

Application January 3, 1956, Serial No. 557,123

3 Claims. (Cl. 99—397)

This invention relates to improvements in barbecue racks.

It is an old art to cook meat and other food products in barbecue pits by supporting the food on an open grille positioned over the barbecue pit. However, I have found it to be problem in simultaneously cooking a plurality of pieces of meat and to turn the meat so as to make sure that the pieces will be cooked on both sides. Turning of the food so as to expose both sides to the fire in the pit has usually been accomplished in one of two ways. Either the pieces of meat are turned individually or else, in the case of a grille comprising two sides between which the meat is disposed, the grille is lifted off of its supports, inverted, and then placed again on its supports. The former approach, especially when cooking for a large gathering, is objectionable because it is time-consuming. The latter approach is objectionable due to the fact that a grille loaded with meat is cumbersome and considerable effort is required to lift and invert it. Accordingly, it is the object of this invention to provide a barbecue rack or grille for use over an open pit that is so constructed as to be invertable without first removing it from its supports and which, in addition, is strong and easy to construct.

Other objects and many of the attendant advantages of this invention will be readily appreciated as the same becomes better understood by reference to the following detailed description when considered in connection with the accompanying drawings, wherein:

Figure 1 is a perspective view of a barbecue rack constructed according to the present invention in position over an open barbecue pit; and, Fig. 2 is a plan view of the same rack in open position.

Referring to the drawings in detail, my novel barbecue rack comprises two grille sections generally designated by the letters "B" and "T." Grille section B comprises a plurality of similar rods 2 secured at their opposite ends to cross rods 4 and 6. The length of rod 4 is substantially the same as the distance between the outside rods 2a and 2b. Rod 6 is of greater length so that its ends 6a and 6b extend beyond outside rods 2a and 2b. Slidably associated with the end 6a of cross rod 6 is a latch link comprising a pair of short hollow sleeves or collars 8a and 8b secured together in parallel relation. Cross rod 6 extends through sleeve 8a with the latter being rotatable and slidable relative to the former. A second latch link comprising sleeves 10a and 10b secured to each other is associated with cross rod 6 at its opposite end, cross rod 6 extending through sleeve 10a so that the latter is slidable and rotatable thereon. Small welds 12 and 14 are provided on cross rod 6 to limit axial movement of the latch links, thereby preventing their being removed from the cross rod. In this way there is no danger of the links being lost or misplaced.

Secured to rods 2 is a third cross rod 16 which is substantially longer than cross rod 4 and preferably is about the same length as cross rod 6. Cross rod 16 is positioned slightly closer to cross rod 4 than it is to cross rod 6 so that the center of gravity of grille section B is to the left of rod 16, as viewed in Fig. 2. The distances between rod 16 and rods 4 and 6 may even be the same if desired, provided, however, that the center of gravity of section B is located between rod 16 and rod 6. This may be accomplished by making rod 6 from rod stock of greater diameter and hence greater weight than the rod stock from which rod 4 is made. The other grille section T is similarly secured to section B, comprising three cross rods 24, 26, and 28 secured to a plurality of parallel rods 22. Rods 22 have the same length as rods 2. Cross rods 24 and 28 have substantially the same length as cross rod 4. Cross rod 26 is slightly longer than cross rods 24 and 28, but shorter than the distance between the two latch links when the latter are positioned up against welds 12 and 14. The distance between cross rods 24 and 28 is the same as the distance between cross rod 4 and cross rod 16. The two sections B and T are hinged together by means of three hinge links 30, 32 and 34. Each hinge link, like the two latch links, comprises two sleeves secured together in parallel relation, one sleeve being rotatably mounted on cross rod 4 and the other sleeve being similarly mounted on cross rod 24. Axial movement of the hinge links along cross rods 4 and 24 is limited by rods 2 and 22 as is believed obvious from an examination of the drawings. By virtue of the hinge links the two sections B and T are prevented from being detached while at the same time being movable relative to each other from the open position of Fig. 2 to the closed position of Fig. 1, and vice versa. Since the cross rods are located on corresponding sides of rods 2 and 22, when the sections are brought together the cross rods of one section engage the corresponding cross rods of the other section so as to keep rods 2 and 22 in spaced relation to each other. The latch links are slipped over the ends of rod 26 to hold the two sections together.

In using the foregoing barbecue rack the two sections are opened to the position shown in Fig. 2 and the articles of food to be cooked, e. g. chops, steaks, halves of chicken, etc., are placed on one of the sections, in even distribution, preferably section B. Then the two sections are swung together and the latch links slipped over the ends of rod 26 of section T. Then the rack is carried to and positioned over a barbecue pit P (Fig. 1). As shown, rods 6 and 16, being longer than the other cross rods, rest on the top of walls W of the pit which act to support the rack. The rack will remain in a horizontal position due to the center of gravity being located between rods 6 and 16. After the rack has remained in this position for some time during which the lower or bottom sides of the meat articles supported thereon is being cooked, it becomes necessary to expose the upper side of the meat articles to the pit. Due to the improved construction of the rack, this is easily accomplished by grasping the ends of bar 6 and lifting up on the bar, or by pressing down on rod 24. The rack will rotate in the direction shown by the arrows in Fig. 1, rod 16 acting as a pivot for the rack. The rack will rotate 180° or until rod 6 again engages the tops of walls W. The rack will remain in this position until again rotated or until lifted up off of the walls W and carried away from the pit. Thus the full weight of the rack is borne by the user or chef only when the rack is being carried to and away from the pit. In turning the rack the walls of the pit will carry most of the weight and the only effort required is to overcome the slight unbalance due to rod 16 being located to one side of the center of gravity of the rack.

In practice, it is preferred to construct the rack entirely of stainless steel. The rods are welded at all points of intersection and the sleeves comprising the latch and hinge links are brazed or welded to each other.

As an example of the size of rods and sleeves which may be employed and the spacing which may be allowed between the rods, it is pointed out that a rack embodying the features of this invention was constructed using $\frac{3}{16}''$ rod stock for all intermediate cross rods 2 and 22, $\frac{3}{8}''$ rod stock for the end rods 2a and 2b and the corresponding end rods 22 and 22b, $\frac{3}{8}''$ rod stock for rods 4, 24, 26, and 28, $\frac{1}{2}''$ rod stock for rod 6 and $\frac{5}{8}''$ rod stock of rod 16. In the same rack rods 2 and 22 were 30'' long, the sleeves of the hinge links were of the same diameter sufficient to fit over rods 4 and 24, and the sleeves of the latch links were of different diameters, one sufficiently large to accommodate rod 6 and the other slightly smaller to accommodate rod 26. In the same rack the center to center measurement of rods 6 and 16 was $15\frac{1}{2}''$.

With the aforesaid construction it was found that the rack was strong, neat in appearance, could be easily carried when loaded, the ends of rods 6 and 16 acting as handles, and rotation of the rack over the pit was a simple matter executed with little effort.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

I claim:

1. A barbecue rack comprising first and second rectangular grille sections, said first grille section comprising a first plurality of grille rods of identical length disposed in parallel spaced relation, a first cross-rod running transversely of said first grille rods and fixedly secured to corresponding ends thereof, and a second cross-rod slightly longer than said first cross-rod fixedly secured to the opposite ends of said first grille rods in parallel relation to said first cross-rod, said second grille section comprising a second plurality of parallel spaced grille rods identical in length to said first grille rods, a third cross-rod equal in length to said first cross-rod fixedly secured to one end of each of said second grille rods, a fourth cross-rod of greater length than said second cross-rod fixedly secured to the opposite ends of said second grille rods, and a fifth cross-rod substantially equal in length to said fourth cross-rod disposed parallel to said third and fourth cross-rods and fixedly secured to each of said second grille rods intermediate said third and fourth cross-rods but closer to said third cross-rod than to said fourth cross-rod, whereby the center of gravity of said second grille section is located between said fourth and fifth cross-rods, means hingedly connecting said first and third cross-rods whereby said grille sections may be swung into superposed relation, and latch means carried by the opposite ends of said fourth cross-rod for releasably locking said second and fourth rods together whereby to hold said grille sections in superposed relation.

2. A rack as defined by claim 1, wherein each of said latch means comprises a first portion slidably surrounding said fourth rod and a second portion provided with an opening to receive said second rod, both of said latch means being slidable toward said grille sections into locking engagement with said second rod and slidable away from said grille sections out of locking engagement with said second rod.

3. A rack as defined by claim 1, wherein said first and second rods are disposed on the same side of said first grille rods and said third, fourth and fifth grille rods are disposed on the corresponding side of said second grille rods whereby with said grille sections in superposed relation said first and second rods are engaged by said third and fourth rods respectively and said fifth rod is sandwiched between said grille sections.

References Cited in the file of this patent
UNITED STATES PATENTS

| | | |
|---|---|---|
| 706,502 | Van Wie | Aug. 5, 1902 |
| 852,624 | Rugg | May 7, 1907 |
| 1,143,603 | Aaron | June 22, 1915 |
| 1,517,795 | Morrison et al. | Dec. 2, 1924 |
| 2,102,097 | Sherman | Dec. 14, 1937 |
| 2,297,825 | Bobo | Oct. 6, 1942 |